US012571475B2

(12) United States Patent
Garza et al.

(10) Patent No.: US 12,571,475 B2
(45) Date of Patent: Mar. 10, 2026

(54) GATE VALVE WITH POSITIVE GATE STOP

(71) Applicant: FMC Technologies, Inc., Houston, TX (US)

(72) Inventors: Jose Angel Garza, Spring, TX (US); Roman Chirko, Tomball, TX (US); Gabriel Tiviroli-Melchert, Missouri City, TX (US); Joshua Duane Douglas, Pearland, TX (US)

( * ) Notice: Subject to any disclaimer, the term of this patent is extended or adjusted under 35 U.S.C. 154(b) by 0 days.

(21) Appl. No.: 18/437,826

(22) Filed: Feb. 9, 2024

(65) Prior Publication Data

US 2025/0257808 A1 Aug. 14, 2025

(51) Int. Cl.
*F16K 3/30* (2006.01)
*F16K 3/02* (2006.01)
*F16K 3/314* (2006.01)

(52) U.S. Cl.
CPC .............. *F16K 3/30* (2013.01); *F16K 3/0254* (2013.01); *F16K 3/314* (2013.01)

(58) Field of Classification Search
CPC .......... F16K 3/30; F16K 3/0254; F16K 3/314
USPC .................................. 251/326–329, 284–285
See application file for complete search history.

(56) References Cited

U.S. PATENT DOCUMENTS

| | | | | |
|---|---|---|---|---|
| 3,412,750 | A * | 11/1968 | Volpin ................. | F16K 3/0272 137/315.32 |
| 4,230,299 | A * | 10/1980 | Pierce, Jr. .............. | F16K 39/04 251/282 |
| 6,536,740 | B2 * | 3/2003 | Hademenos ........ | F15B 15/1476 251/63.4 |
| 11,460,114 | B2 * | 10/2022 | Ellis ........................ | F16K 17/18 |
| 2021/0231222 | A1 * | 7/2021 | Ellis ...................... | F16K 3/0227 |

* cited by examiner

*Primary Examiner* — John Bastianelli
(74) *Attorney, Agent, or Firm* — Henry C. Query, Jr.

(57) ABSTRACT

A gate valve includes a valve body having a gate cavity, a bonnet mounted to the valve body over the cavity, a valve stem movably positioned in an axial stem bore in the bonnet, a gate positioned in the cavity and connected to the valve stem, a downwardly directed first stop surface fixed in position relative to the valve stem, and an upwardly directed second stop surface fixed in position relative to the bonnet. In operation, when the gate is moved downward from the open position to the closed position, the first stop surface will engage the second stop surface and thereby prevent the bottom of the gate from contacting the bottom of the gate cavity.

7 Claims, 16 Drawing Sheets

GATE VALVE WITH POSITIVE GATE STOP

FIELD OF THE DISCLOSURE

The present disclosure is directed to a gate valve. More particularly, the disclosure is directed to a gate valve which includes a positive stop arrangement for preventing the bottom of the gate from contacting the bottom of the gate cavity as the gate is moved downward from the open position to the closed position.

BACKGROUND OF THE DISCLOSURE

Prior art gate valves typically include a valve body, a flowbore which extends through the valve body, a gate cavity which extends from a top opening in the valve body across the flowbore, and a gate which is movably positioned in the cavity. The gate includes a transverse through bore and may be positioned between a pair of seats having corresponding through holes which are aligned with the flowbore. The gate is connected to a valve stem which extends through a bonnet connected to the valve body over the top opening. The distal end of the valve stem is normally connected to a valve actuator which is operable to move the gate between an open position in which the through bore is aligned with the through holes and fluid is permitted to flow through the flowbore, and a closed position in which the through bore is offset from the through holes and fluid is prevented from flowing through the flowbore.

For gate valves to operate correctly, the gate must be allowed to "float" (i.e., move slightly in a direction parallel to the axis of the flowbore) when in the closed position in order to effect a proper seal with the valve seats. This "float" can be prevented if the gate is allowed to bottom out against the bottom of the cavity.

In manually operated gate valves having a handwheel, the "float" is provided by backing off the handwheel by a quarter turn after the gate bottoms out on the bottom of the cavity. In hydraulically operated gate valves, the hydraulic actuator is normally configured to automatically back off the gate, or to stop the gate before it contacts the bottom of the cavity.

However, the requirement to back off the handwheel a quarter turn can occasionally be overlooked. Also, hydraulically-operated gate valves can require specific configuration, calibration and setup to ensure the hydraulic actuator maintains the necessary float.

SUMMARY OF THE DISCLOSURE

In accordance with the present disclosure, a gate valve is provided which comprises a valve body having opposite first and second ends, a flowbore which extends through the valve body between the first and second ends, and a gate cavity which extends from a top opening in the valve body across the flowbore; a bonnet mounted to the valve body over the top opening, the bonnet comprising an axial stem bore connected to the gate cavity; a valve stem movably positioned in the stem bore, the valve stem comprising a first end which extends into the gate cavity; a gate connected to the first end of the valve stem, the gate comprising a transverse through bore and being movable by the valve stem between an open position in which the through bore is aligned with the flowbore and a closed position in which the through bore is offset from the flowbore; a downwardly directed first stop surface which is fixed in position relative to the valve stem; and an upwardly directed second stop surface which is fixed in position relative to the bonnet;

wherein when the gate is moved downward from the open position to the closed position, the first stop surface will engage the second stop surface and thereby prevent a bottom of the gate from contacting a bottom of the gate cavity.

In accordance with an aspect of the disclosure, the gate valve may comprise a valve actuator mounted on the bonnet, the valve actuator comprising an actuator shaft connected to a second end of the valve stem.

In accordance with another aspect of the disclosure, the first stop surface may be connected to or formed integrally with the valve stem or the actuator shaft.

In accordance with a further aspect of the disclosure, the second stop surface may be connected to or formed integrally with the bonnet.

In accordance with yet another aspect of the disclosure, the actuator shaft may be connected to the valve stem through a positive stop member and the first stop surface may be formed on the positive stop member.

In accordance with another aspect of the disclosure, the second stop surface may be formed on a positive stop housing which is connected to the bonnet over the stem bore and includes an axial through hole through which the second end of the valve stem extends.

In accordance with a further aspect of the disclosure, the second stop surface may be formed on a packing nut secured in an upper end of the stem bore.

In accordance with yet another aspect of the disclosure, the second stop surface may be formed on the bonnet.

In accordance with an aspect of the disclosure, the first stop surface may be formed on the actuator shaft and the second stop surface may be formed on a positive stop housing which is connected to the bonnet over the stem bore and includes an axial through hole through which the second end of the valve stem extends.

In accordance with another aspect of the disclosure, the first stop surface may be formed on the actuator shaft and the second stop surface may be formed on a packing nut secured in an upper end of the stem bore.

In accordance with a further aspect of the disclosure, the first stop surface may be formed on the actuator shaft and the second stop surface may be formed on the bonnet.

In accordance with yet another aspect of the disclosure, the first stop surface may formed on a positive stop member which is connected to or formed integrally with the valve stem and the second stop surface may be formed on a positive stop housing which is connected to the bonnet over the stem bore and includes an axial through hole through which the second end of the valve stem extends.

In accordance with an aspect of the disclosure, the first stop surface may be formed on a positive stop member which is connected to or formed integrally with the valve stem and the second stop surface may be formed on a packing nut secured in an upper end of the stem bore.

In accordance with another aspect of the disclosure, the first stop surface may be formed on a positive stop member which is connected to or formed integrally with the valve stem and the second stop surface may be formed on the bonnet.

In accordance with a further aspect of the disclosure, the first stop surface may be formed on a positive stop member which is fixed in position relative to the valve stem and the second stop surface may be formed on a packing nut positioned in the stem bore and fixed in position relative to the bonnet.

In accordance with an aspect of the disclosure, the first stop surface may be formed on a positive stop member which is fixed in position relative to the valve stem and the second stop surface may be formed on the bonnet.

In accordance with another aspect of the disclosure, the valve actuator may comprises an actuator housing which is fixed in position relative to the bonnet, the second stop surface may be formed on a positive stop housing which is connected to the bonnet over the stem bore, and the actuator housing may be connected to the positive stop housing.

In accordance with a further aspect of the disclosure, the valve actuator may comprise a stem adapter having a first end which is operatively linked to the actuator shaft and a second end which is connected to a valve operator, the valve operator may comprise a rotary electric actuator which is connected to the actuator housing or to a support sleeve which is secured to the actuator housing, and the rotary electric actuator may include an output shaft connected to the stem adapter.

In accordance with yet another aspect of the disclosure, the first and second stop surfaces may be positioned outside of an actuator which is connected to the valve stem and is configured to move the gate between the open and closed positions.

In accordance with another aspect of the disclosure, the actuator does not have a positive stop surface or position control functionality.

In accordance with a further aspect of the disclosure, the axial distance between the first stop surface and the bottom of the gate and/or the axial distance between the second stop surface and the bottom of the cavity may be adjustable.

In accordance with one aspect of the disclosure, the first stop surface may be rotationally associated with the valve stem such that rotation of the first stop surface relative to the valve stem results in axial translation of the first stop surface relative to the valve stem.

In accordance with another aspect of the disclosure, the second stop surface may be rotationally associated with the bonnet such that rotation of the second stop surface relative to the bonnet results in axial translation of the second stop surface relative to the bonnet.

The positive stop arrangement thus prevents the gate from bottoming out against the valve body (e.g., the bottom of the gate cavity) when the gate is moved downward from the open position to the closed position. The positive stop arrangement may include a downwardly directed first stop surface which is fixed in position relative to the valve stem and an upwardly directed second stop surface which is fixed in position relative to the bonnet. Accordingly, when the gate is moved downward from the open position to the closed position, the first stop surface will engage the second stop surface and thereby prevent the bottom of the gate from contacting the bottom of the gate cavity.

The positive stop arrangement of the present disclosure is beneficial because it is implemented in the gate valve itself, rather than the actuator. As a result, the gate valve can be agnostic with respect to the type of actuation and not require additional calibration or actions by a user, such as backing off a handwheel.

The positive stop arrangement of the present disclosure is particularly beneficial when the gate valve is used with an electric actuator. The positive stop arrangement eliminates the need for the electric actuator to stop the gate before it contacts the bottom of the cavity or to back off the gate if it does contact the bottom of the cavity. As a result, the electric actuator does not require costly position control functionality in order to stop or back off the gate, and it does not require an expensive variable speed or variable frequency drive in order to control the actuation speed. In essence, the positive stop arrangement enables the electric actuator to be an uncomplicated, inexpensive device which can simply be hooked up to a power source and run until the gate closes.

These and other objects and advantages of the present disclosure will be made apparent from the following detailed description, with reference to the accompanying drawings.

DETAILED DESCRIPTION OF THE DISCLOSURE

Figure 1:
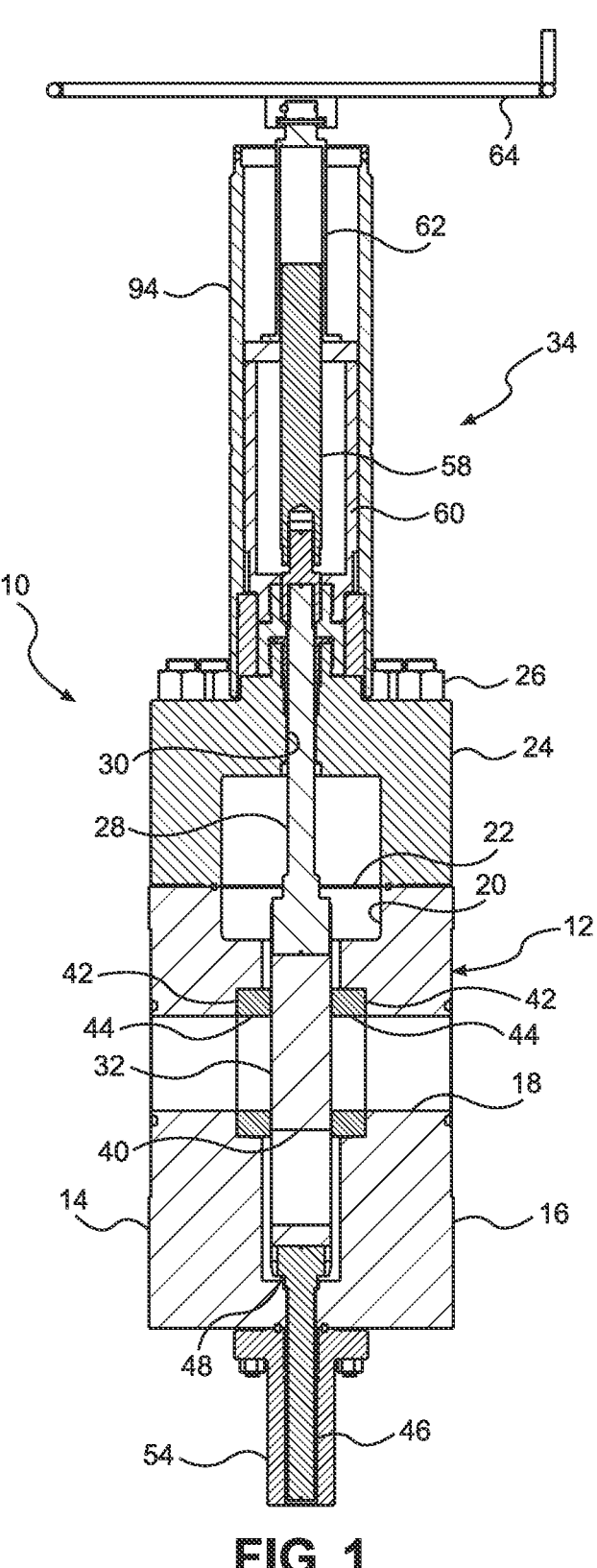
FIG. 1 is a cross sectional view of an illustrative embodiment of a gate valve in accordance with the present disclosure.

An illustrative embodiment of the gate valve of the present disclosure is shown in FIG. 1. The gate valve of this embodiment, which is indicated generally by reference number 10, includes a valve body 12 having opposite first and second ends 14, 16, a flowbore 18 which extends through the valve body between the first and second ends 14, 16, and a gate cavity 20 which extends from a top opening 22 in the valve body across the flowbore and comprises a bottom 20a. A valve bonnet 24 is mounted to the valve body 12 over the top opening 22 and may be removably secured to the valve body by conventional means, such as a plurality of bolts 26.

Figure 2:
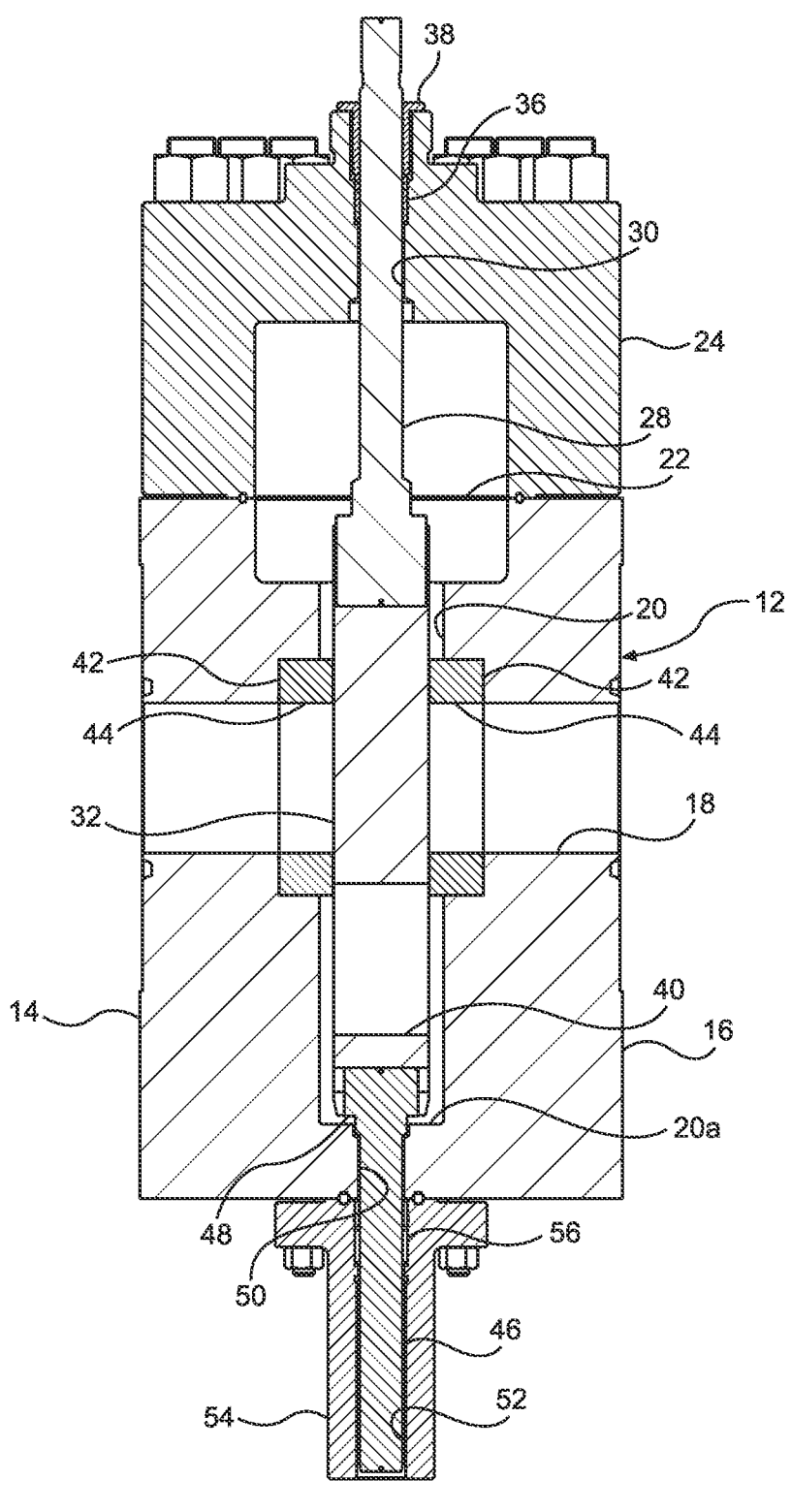
FIG. 2 is an enlarged cross sectional view of the lower half of the gate valve shown in FIG. 1.

The gate valve 10 further includes a valve stem 28 which extends through an axial stem bore 30 formed in the bonnet 24. The valve stem 28 has a first end which is connected to a gate 32 positioned in the cavity 20 and a second end which is connected to a valve actuator 34 mounted to the bonnet 24. Referring also to FIG. 2, the valve stem 28 may be sealed to the bonnet 24 using a conventional packing 36 positioned in, e.g., an enlarged diameter portion of the stem bore 28. The packing 36 may be retained in the stem bore 28 using a suitable packing nut 38 which is threadedly connected to the stem bore or otherwise fixed in position relative to the bonnet 24.

The gate 32 includes a transverse through bore 40 which, when the gate valve 10 is in the open position, is aligned with the flowbore 18. The gate 32 may be slidably disposed between a pair of seats 42, each of which includes an axial through hole 44 which is aligned with the flowbore 18. In the open position of the gate valve 10, the through bore 40 is aligned with the through holes 44 and fluid is therefore permitted to flow through the flowbore 18. In the closed position of the gate valve 10, which is shown in FIGS. 1 and 2, the through bore 40 is offset from the through holes 44 and fluid is therefore prevented from flowing through the flow-bore 18.

Although not required for purposes of the present disclosure, the gate valve 10 may also include a balancing stem 46 for balancing the force on the gate 32 which is generated by ambient pressure acting on the valve stem 28. In this example, the balancing stem 46 is connected to a bottom end 48 of the gate 32 (i.e., the end of the gate opposite the valve stem 28) and extends through an axial opening 50 in the valve body 12. The balancing stem 46 is slidably received in an axial through bore 52 in a lower bonnet 54 mounted to the valve body 12 and is sealed thereto by a suitable packing 56 to thereby contain pressure in the cavity 20.

Figure 3:
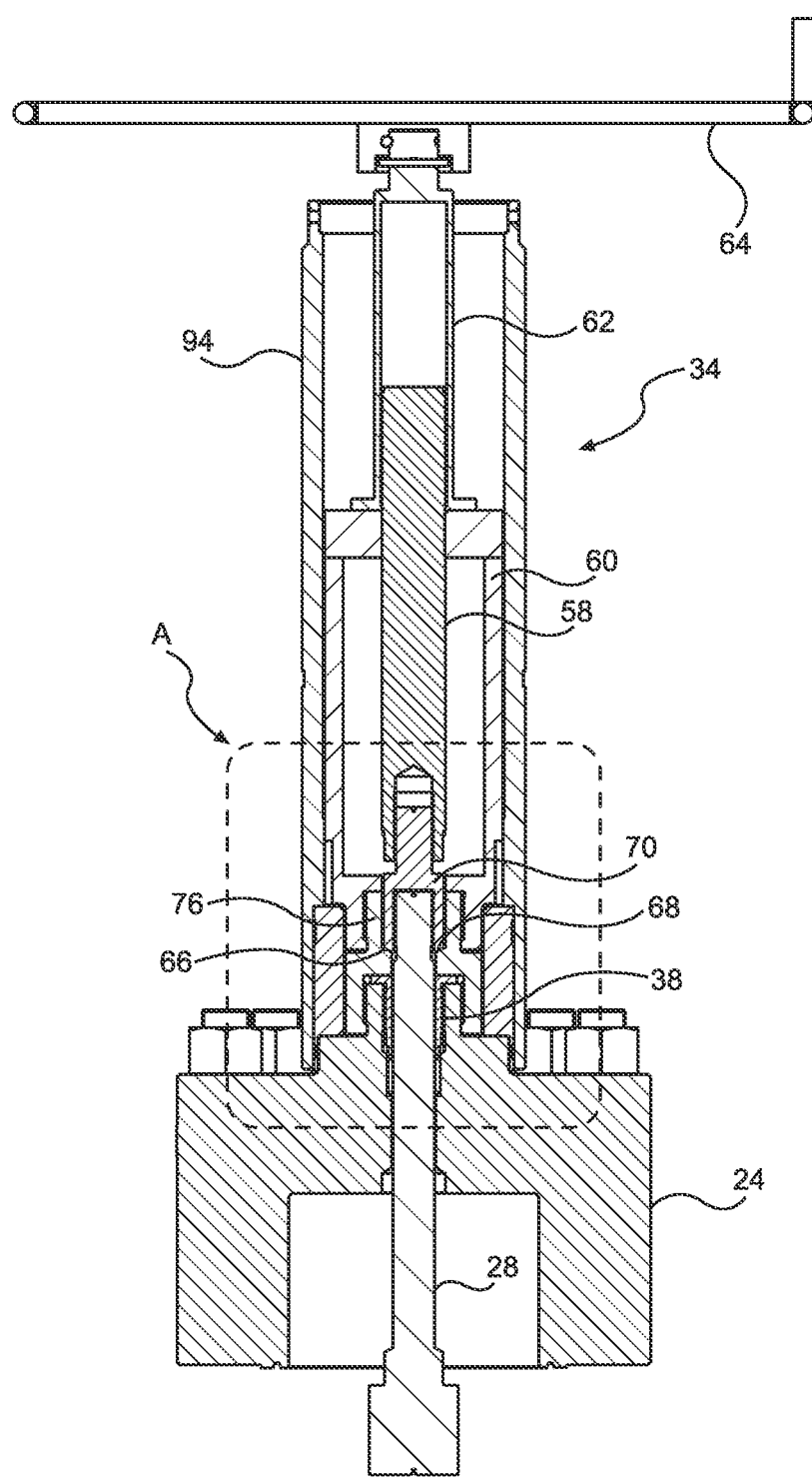
FIG. 3 is an enlarged cross sectional view of the upper half of the gate valve shown in FIG. 1.

Referring also to FIG. 3, the valve actuator 34 may include an actuator shaft 58 which is connected to the valve stem 28. The actuator shaft 58 may be supported in an actuator housing 60 which is fixed in position relative to the bonnet 24. A stem adapter 62 to which a valve operator, such as a handwheel 64, is connected may be rotationally supported in the actuator housing 60. The actuator shaft 58 may be operatively linked with the stem adapter 62 such that rotation of the handwheel 64 results in axial translation of the actuator shaft 58 and, thus, the valve stem 28 to thereby move the gate 32 between the open and closed positions. In some embodiments, the actuator 34 may comprise a conventional ball screw in which the actuator shaft 58 defines the screw shaft and the stem adapter 62 is linked to the actuator shaft through a ball nut.

The illustrative gate valve 10 is of a type in which the gate 32 is allowed to "float" (i.e., move slightly in a direction parallel to the axis of the flowbore 18) when in the closed position in order to effect a proper seal with the valve seats 42. This motion is facilitated by using connections between the valve stem 28 and the top of the gate 32 (and between the balancing stem 46, if present, and the bottom of the gate) which permit movement of the gate relative to the valve stem (and the balancing stem, if present). Such connections are conventional and may include, for example, a slot and key connection or a pin and socket connection.

In prior art gate valves of this type, when the gate is moved downward from the open position to the closed position, the gate will eventually bottom out against the bottom of the cavity. This will usually prevent the gate from being able to float within the cavity, which in turn will prevent the gate from forming an effective seal with the seats.

Therefore, after the gate bottoms out on the cavity, the gate must be raised slightly so that the bottom of the gate is spaced apart from the bottom of the cavity when in the closed position. In manually operated gate valves having a handwheel, for instance, the handwheel must be backed off a quarter turn after the gate bottoms out on the bottom of the cavity. In hydraulically operated gate valves, the hydraulic actuator is normally configured to automatically back off the gate.

However, the requirement to back off the handwheel a quarter turn can occasionally be overlooked. Also, should a need or desire to replace the handwheel with an electric actuator arise, such an actuator must normally include an expensive variable speed or variable frequency drive in order to control the speed of actuation or costly position control functionality, such as a valve positioner, in order to stop the gate before it contacts the bottom of the cavity or to back off the gate if it does contact the bottom of the cavity.

According to the present disclosure, the gate valve 10 includes a positive stop arrangement for preventing the gate 32 from bottoming out against the valve body 12 (e.g., the bottom of the gate cavity 20) when the gate is moved downward from the open position to the closed position. In particular, the positive stop arrangement may include a downwardly directed first stop surface which is fixed in position relative to the valve stem and an upwardly directed second stop surface which is fixed in position relative to the bonnet. Accordingly, when the gate is moved downward from the open position to the closed position, the first stop surface will engage the second stop surface and thereby prevent the bottom of the gate from contacting the bottom of the gate cavity.

In the illustrative embodiment of the disclosure shown in FIGS. 1-3, the gate valve 10 includes a positive stop arrangement in the form of a downwardly directed first stop surface 66 which is fixed in position relative to the valve stem 28 and an upwardly directed second stop surface 68 which is fixed in position relative to the bonnet 24. In some embodiments, the first stop surface 66 may be connected to or formed integrally with the valve stem 28 or the actuator shaft 58. Likewise, the second stop surface 68 may be connected to or formed integrally with the bonnet 24.

Figure 4:
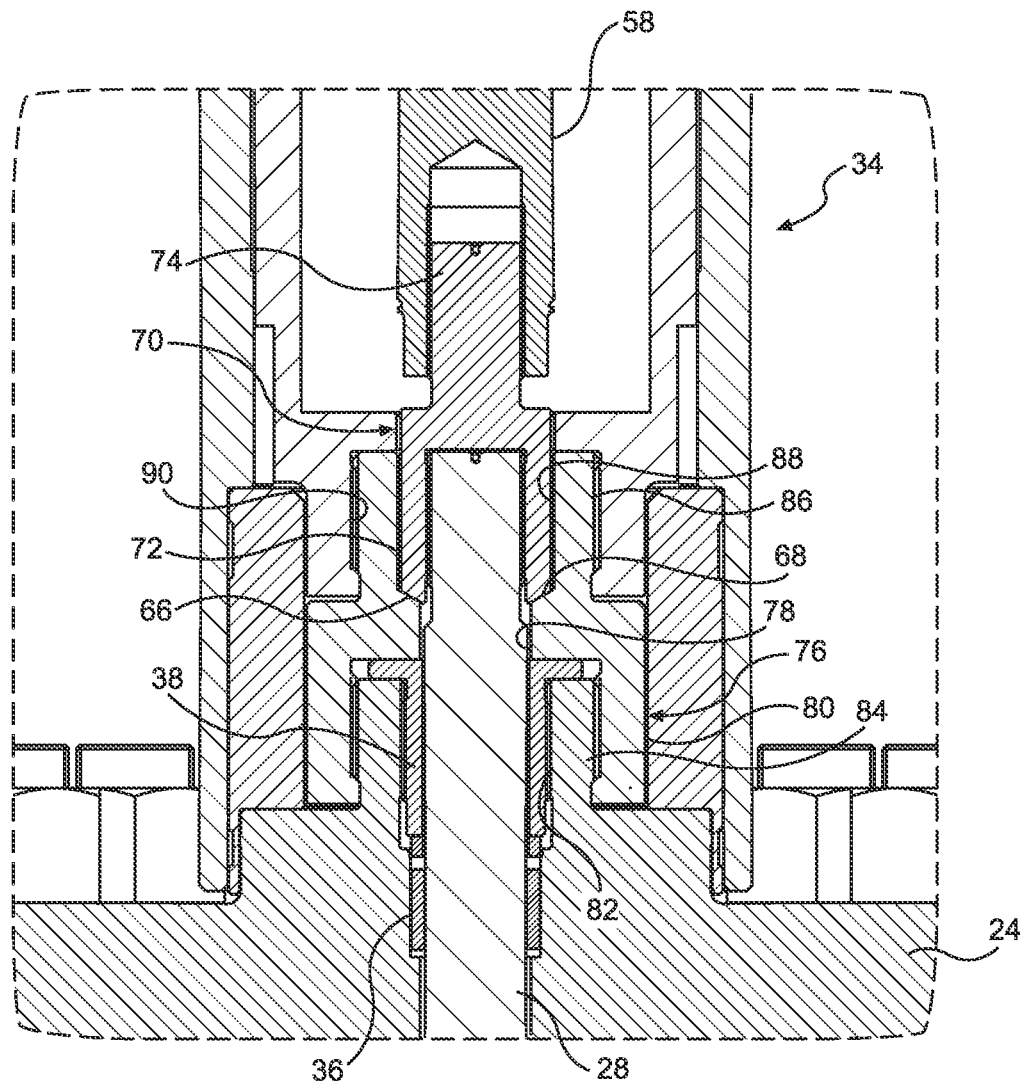
FIG. 4 is an enlarged view of the portion of the gate valve enclosed by the dashed box B in FIG. 3.

Referring also to FIG. 4, which is an enlarged view of the portion of the gate valve 10 enclosed by the dashed box A in FIG. 3, the first stop surface 66 may be formed, for example, on a positive stop member 70 which is connected between the valve stem 28 and the actuator shaft 58. The positive stop member 70 may take the form of a connector having a female end 72 to which the second or top end of the valve stem 28 is connected and a male end 74 to which the bottom end of the actuator shaft 58 is connected. In this embodiment, the first stop surface 66 is formed on or proximate a bottom end of the positive stop member 70 coaxially with the valve stem 28.

In the illustrative embodiment of the positive stop arrangement shown in FIGS. 1-4, the second stop surface 68 may be formed on a positive stop housing 76 which is connected to the bonnet 24 over the stem bore 30 and includes an axial through hole 78 through which the second end of the valve stem 28 extends. The positive stop housing 76 may take the form of a connecting collar which includes a lower end 80 having a counterbore 82 secured to an upstanding neck portion 84 of the bonnet 24 and an upper end 86 having a socket 88 configured to receive the female end 72 of the positive stop member 70. In this embodiment, the second stop surface 68 is formed on or proximate a bottom end of the socket 88 coaxially with the valve stem 28. In some embodiments, the upper end 86 of the positive stop housing 76 may define a male connector which is secured in a corresponding receptacle 90 formed in the bottom of the actuator housing 60 to thereby connect the valve actuator 34 to the bonnet 24.

In operation of the gate valve 10, starting from the valve open position the handwheel 64 may be rotated to move the gate 32 downward towards its closed position. After the through bore 40 is fully offset from the through holes 44 (i.e., after the gate 32 is fully closed) but before the bottom 48 of the gate 32 contacts the bottom 20a of the gate cavity 20, the first stop surface 66 will engage the second stop surface 68 and thereby prevent the gate from moving further downward. This may be accomplished by designing the gate valve 10 such that the distance between first stop surface 66 and the bottom 48 of the gate 32 is less than the distance between the second stop surface 68 and the bottom 20a of the cavity 20. In this manner, the engagement of the first stop surface 66 with the second stop surface 68 will prevent the bottom 48 of the gate 32 from contacting the bottom 20a of the gate cavity 20. As a result, the gate 32 will be allowed to float freely within the cavity 20 to ensure that it seals properly with the seats 42.

One benefit of the present disclosure is that by associating the positive stop arrangement with the gate valve itself rather than the actuator, the gate valve is essentially agnostic with respect to the type of actuator that may be used. In other words, since the positive stop arrangement is incorporated into the gate valve and not the actuator (with the exception of the alternative embodiments discussed below in which the first stop surface is formed on the actuator shaft), the gate valve is compatible with any conventional actuator. For instance, actuation can be accomplished via the handwheel 68, a hydraulic-actuator, an electric actuator or any other type of actuator without requiring additional configuration or calibration to accommodate a particular type of actuator.

Figure 5:
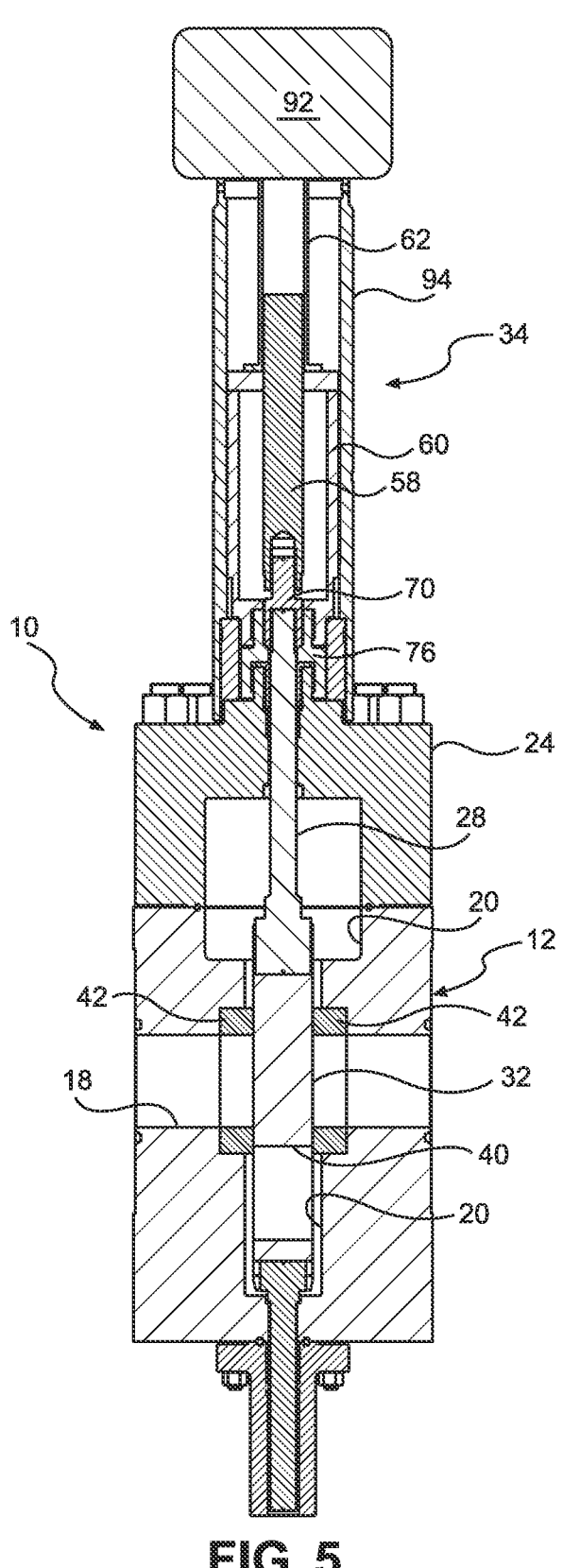
FIG. 5 is a cross sectional view of the gate valve of FIG. 1 showing the handwheel having been replaced by an electric actuator.

Referring to FIG. 5, for example, the gate valve 10 described above is shown with the handwheel 64 replaced with an inexpensive electric actuator 92 which does not include, e.g., a valve positioner to control the position of the gate or a variable-speed or variable frequency drive to limit the speed of the actuation process. In this example, the electric actuator 92 may include an output shaft connected to the stem adapter 62 and a housing connected to a support sleeve 94 that in turn is secured by suitable means to the actuator housing 60 and/or the bonnet 24.

In operation, the electric actuator 92 may be activated to move the gate 32 between its open and closed positions. With the gate 32 in the open position, the electric actuator 92 may be activated to move the gate 32 downward towards the closed position. As discussed above, after the gate 32 is fully closed but before the bottom 48 of the gate 32 contacts the bottom 20_a_ of the gate cavity 20, the first stop surface 66 will engage the second stop surface 68 and thereby prevent the gate from moving further downward. In this manner, the gate 32 will be able to float freely within the cavity 20 to ensure that it seals properly with the seats 42.

Thus, the positive stop arrangement of the present disclosure eliminates the need for the electric actuator 92 to stop the gate 32 before it contacts the bottom of the cavity 20 or to back off the gate if it does contact the bottom of the cavity. As a result, the electric actuator 92 does not require costly position control functionality, such as a valve positioner, in order to stop or back off the gate 32, and it does not require an expensive variable-speed or variable frequency drive in order to limit the speed of the actuation process. In essence, the positive stop arrangement enables the electric actuator 92 to be an uncomplicated, inexpensive device which can simply be hooked up to a power source and run until the gate closes.

Figure 6:
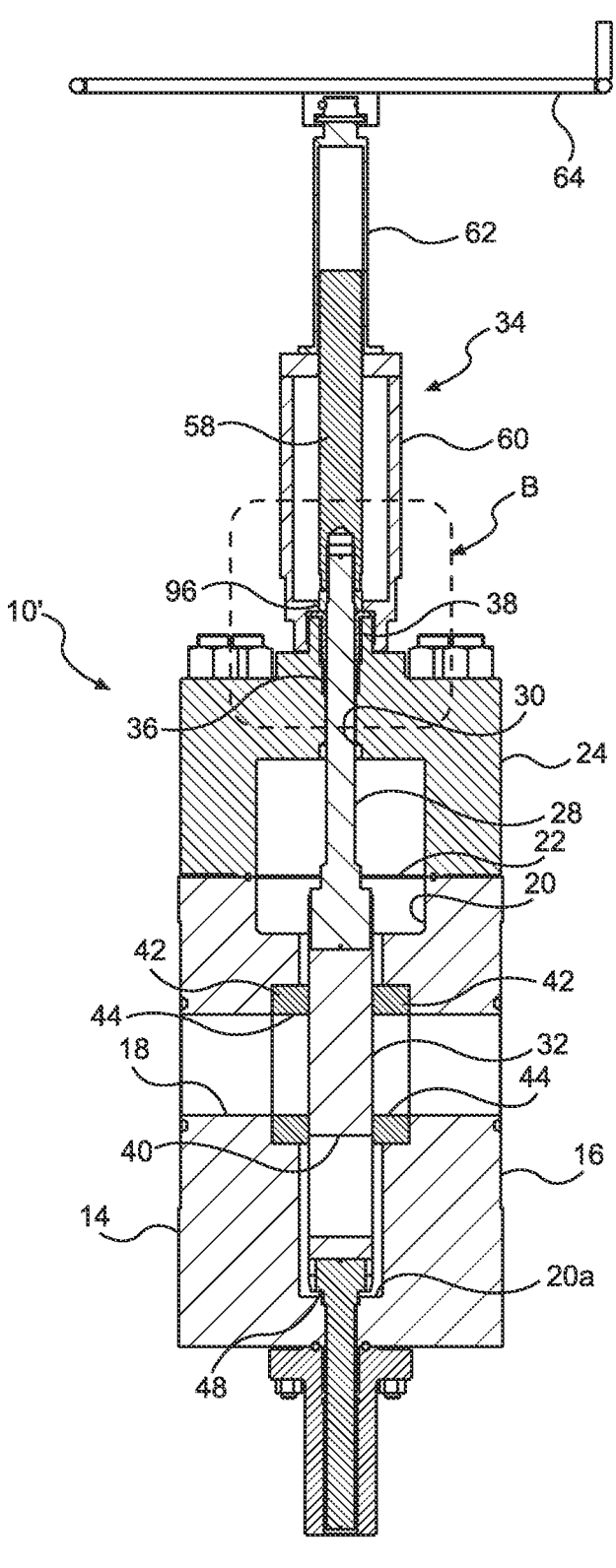
FIG. 6 is a cross sectional view of another illustrative embodiment of a gate valve in accordance with the present disclosure.

Another illustrative embodiment of a gate valve according to the present disclosure is shown in FIG. 6. The gate valve of this embodiment, indicated generally by reference number 10', is similar in many respects to the gate valve 10 described above. Accordingly, the gate valve 10' includes a valve body 12 having first and second ends 14, 16, a flowbore 18 which extends through the valve body between the first and second ends, and a gate cavity 20 which extends from a top opening 22 in the body across the flowbore. A bonnet 24 having an axial stem bore 30 is mounted to the valve body 12 over the top opening 22. A valve stem 28 is movably positioned in the stem bore 30 and is sealed thereto by a conventional stem packing 36. The packing 36 may be retained in the stem bore 30 using a suitable packing nut 38 which is threadedly connected to the stem bore or otherwise fixed in position relative to the bonnet 24.

The valve stem 28 includes a first end which is connected to a gate 32 positioned in the cavity 20 and a second end which is connected to a valve actuator 34. The gate 32 includes a transverse through bore 40 and is slidably disposed between a pair of seats 42, each of which includes an axial through hole 44 which is aligned with the flowbore 18. In operation, the gate 32 is movable by the valve stem 28 between an open position in which the through bore 40 is aligned with the through holes 44 and fluid is therefore permitted to flow through the flowbore 18, and a closed position, shown in FIG. 7, in which the through bore is offset from the through holes and fluid is therefore blocked from flowing through the flowbore.

In accordance with the present disclosure, the gate valve 10' also includes a positive stop arrangement for preventing the bottom of the gate 32 from contacting the bottom of the cavity 20 when the gate is moved into the closed position. The positive stop arrangement may include a downwardly directed first stop surface 66 which is fixed in position relative to the valve stem 28 and an upwardly directed second stop surface 68 which is fixed in position relative to the bonnet 24. Thus, when the gate 32 is moved downward from the open position to the closed position, the first stop surface 66 will engage the second stop surface 68 and thereby prevent the bottom 48 of the gate 32 from contacting the bottom 20_a_ of the gate cavity 30.

Figure 7:
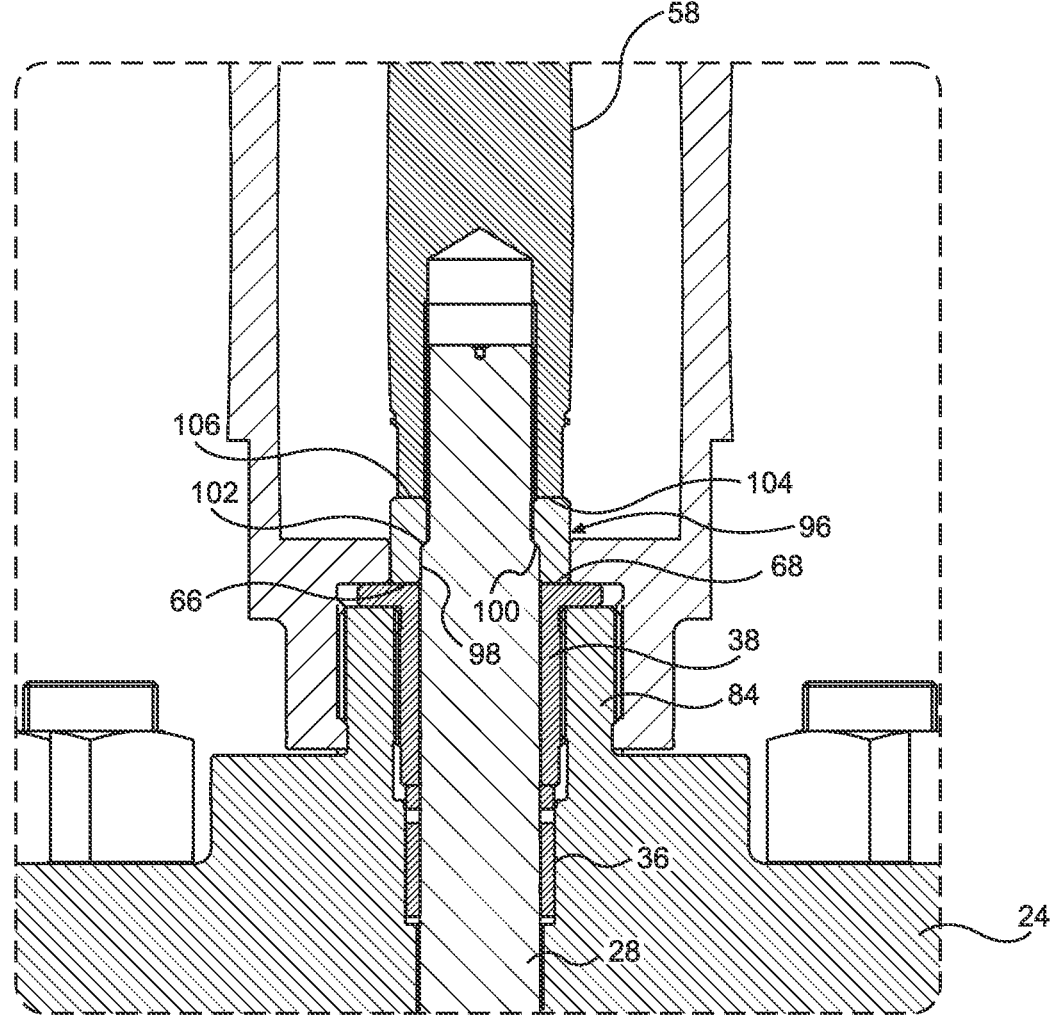
FIG. 7 is an enlarged view of the portion of the gate valve enclosed by the dashed box B in FIG. 6.

Referring also to FIG. 7, which is an enlarged view of the portion of the gate valve 10' enclosed by the dashed box B in FIG. 6, the first stop surface 66 may be formed on a positive stop member 96 in the form of a collar which is fixed in position relative to the valve stem 28 and/or the actuator stem 58 of the valve actuator 34. For example, the positive stop member 96 may include a counterbore 98 which defines a seat 100 that is configured to engage a corresponding shoulder 102 formed on the valve stem 28. The positive stop member 96 may be threaded or otherwise secured to the valve stem 28 or, as shown in FIG. 7, retained in position on the valve stem by the actuator shaft 58 (e.g., by engagement of a bottom end 104 of the actuator shaft 58 with a top end 106 of the positive stop member).

In this embodiment, the first stop surface 66 may be formed on a bottom end of the positive stop member 96 and the second stop surface 68 may be formed on the packing nut 38. In the embodiment shown in FIG. 7, for example, the second stop surface 68 is formed on a top surface of the packing nut 38. Thus, the positive stop arrangement of the present embodiment does not require a separate positive stop housing 76 for the second stop surface 68. Also, instead of being connected to a positive stop housing as in the previous embodiments, the actuator housing 60 is connected directly to the upstanding neck portion 84 of the bonnet 24.

In operation of the gate valve 10', the valve operator, which in FIG. 6 is depicted as a handwheel 64, is rotated to move the gate 32 downward towards the closed position. After the gate 32 is fully closed but before the bottom 48 of the gate 32 contacts the bottom 20_a_ of the gate cavity 20, the first stop surface 66 will engage the second stop surface 68 and thereby prevent the gate from moving further downward. In this manner, the gate 32 will be able to float freely within the cavity 20 to ensure that it seals properly with the seats 42.

Further embodiments of positive stop arrangements in accordance with the present disclosure are shown in FIGS. 8-16.

Figure 8:
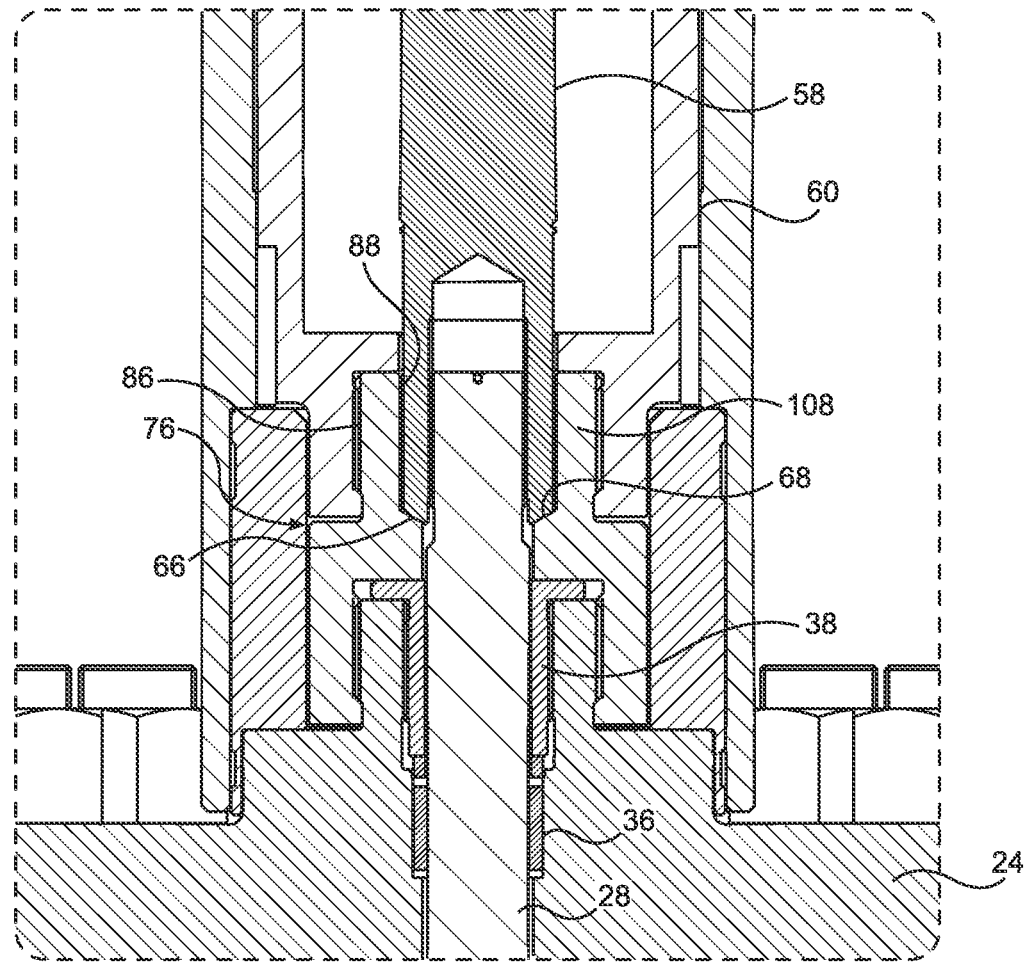
FIGS. 8-16 are enlarged cross sectional views of some examples of positive stop arrangements according to the present disclosure.

The positive stop arrangement shown in FIG. 8 is somewhat similar to the embodiment shown in FIG. 4. However, in the present embodiment the positive stop member 70 is omitted and the first stop surface 66 is formed on the bottom end of the actuator shaft 58 of the valve actuator 34. In this example, the valve stem 28 is connected directly to the actuator shaft 58 and the lower end 108 of the actuator shaft is configured to be received in the socket 88 in the upper end 86 of the positive stop housing 76. As in the embodiment shown in FIG. 4, the second stop surface 68 is formed on or proximate a bottom end of the socket 88 coaxially with the valve stem 28. The positive stop arrangement of the present embodiment is simplified by the elimination of the positive stop member 70.

Figure 9:
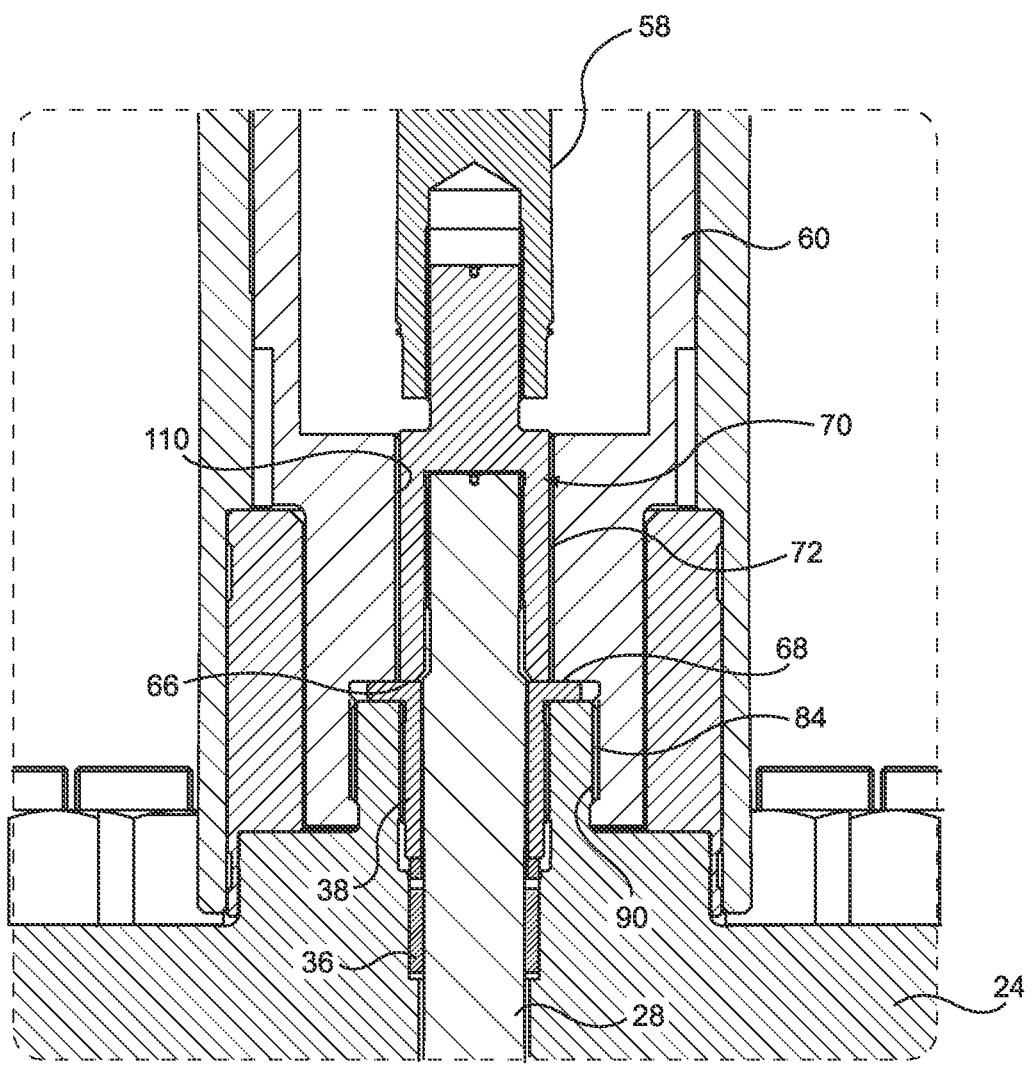

The positive stop arrangement shown in FIG. 9 is somewhat similar to the embodiment shown in FIG. 4. However, in the embodiment shown in FIG. 9, the positive stop housing 76 is eliminated and the second stop surface 68 is formed on a top surface of the packing nut 38. In this embodiment, the receptacle 90 in the bottom end of the actuator housing 60 is connected directly to the upstanding neck portion 84 of the bonnet 24, and the female end 72 of the positive stop member 70 extends through an axial bore 110 in the actuator housing and engages the packing nut 38. As in the embodiment shown in FIG. 4, the first stop surface 66 is formed on or proximate a bottom end of the positive stop member 70 coaxially with the valve stem 28. The positive stop arrangement of the present embodiment is simplified by the elimination of the positive stop housing 76.

Figure 10:
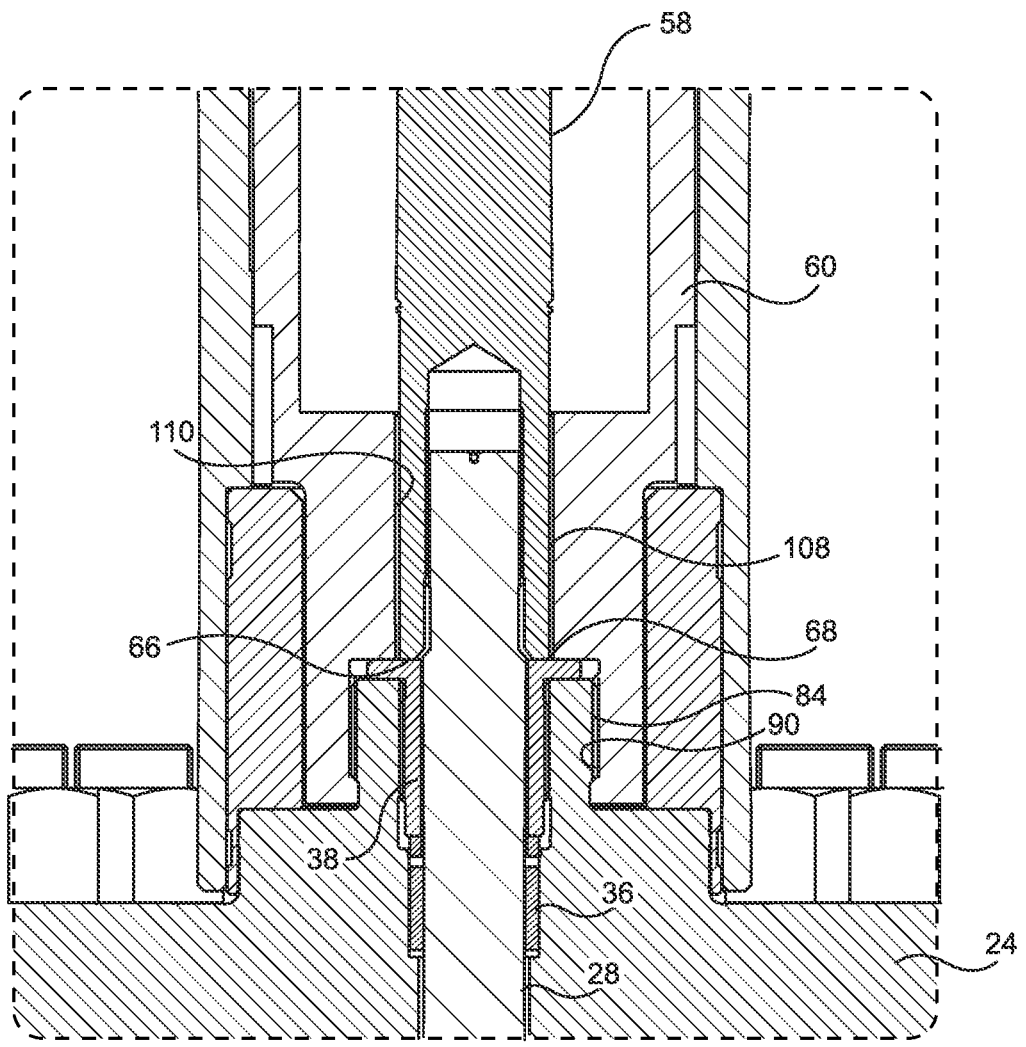

The positive stop arrangement shown in FIG. 10 combines the benefits of the embodiments shown in FIGS. 8 and 9. In the embodiment of FIG. 10, both the positive stop member 70 and the positive stop housing 76 are eliminated. As in the embodiment of FIG. 8, the first stop surface 66 is formed on the bottom end of the actuator shaft 58 of the valve actuator 34. As in the embodiment of FIG. 9, the second stop surface 68 is formed on a top surface of the packing nut 38. In this embodiment, the actuator housing 60 is secured directly to the upstanding neck portion 84 of the bonnet 24, and the lower end 108 of the actuator shaft 58 extends through an axial bore 110 in the actuator housing to the packing nut 38. The positive stop arrangement of the present embodiment is simplified by the elimination of both the positive stop member 70 and the positive stop housing 76.

Figure 11:
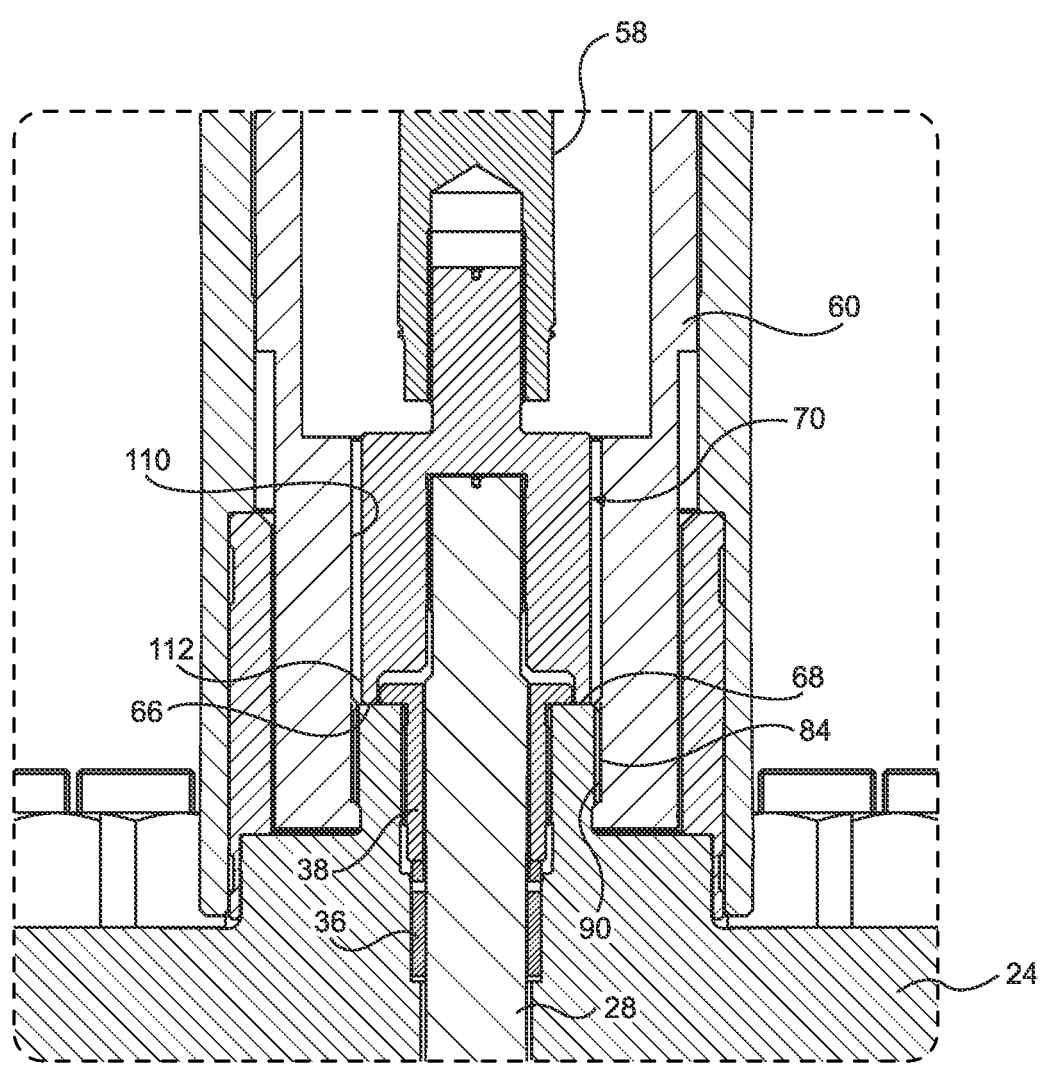

The positive stop arrangement shown in FIG. 11 is somewhat similar to the embodiment shown in FIG. 9. In the present embodiment, however, the second stop surface 68 is formed on a top surface of the upstanding neck portion 84 of the bonnet 24, not on a top surface of the packing nut 38. The first stop surface 66 is formed on the bottom end of the positive stop member 70, which in the present embodiment is provided with an axially extending rim portion 112 configured to straddle the top of the packing nut 38 and directly engage the top surface of the neck portion 84. By having the first stop surface 66 engage the top surface of the neck portion 84 instead of the top surface of the packing nut 38, potential damage to the packing nut can be avoided. In addition, the positive stop arrangement of the present embodiment is simplified by the elimination of the positive stop housing 76.

Figure 12:
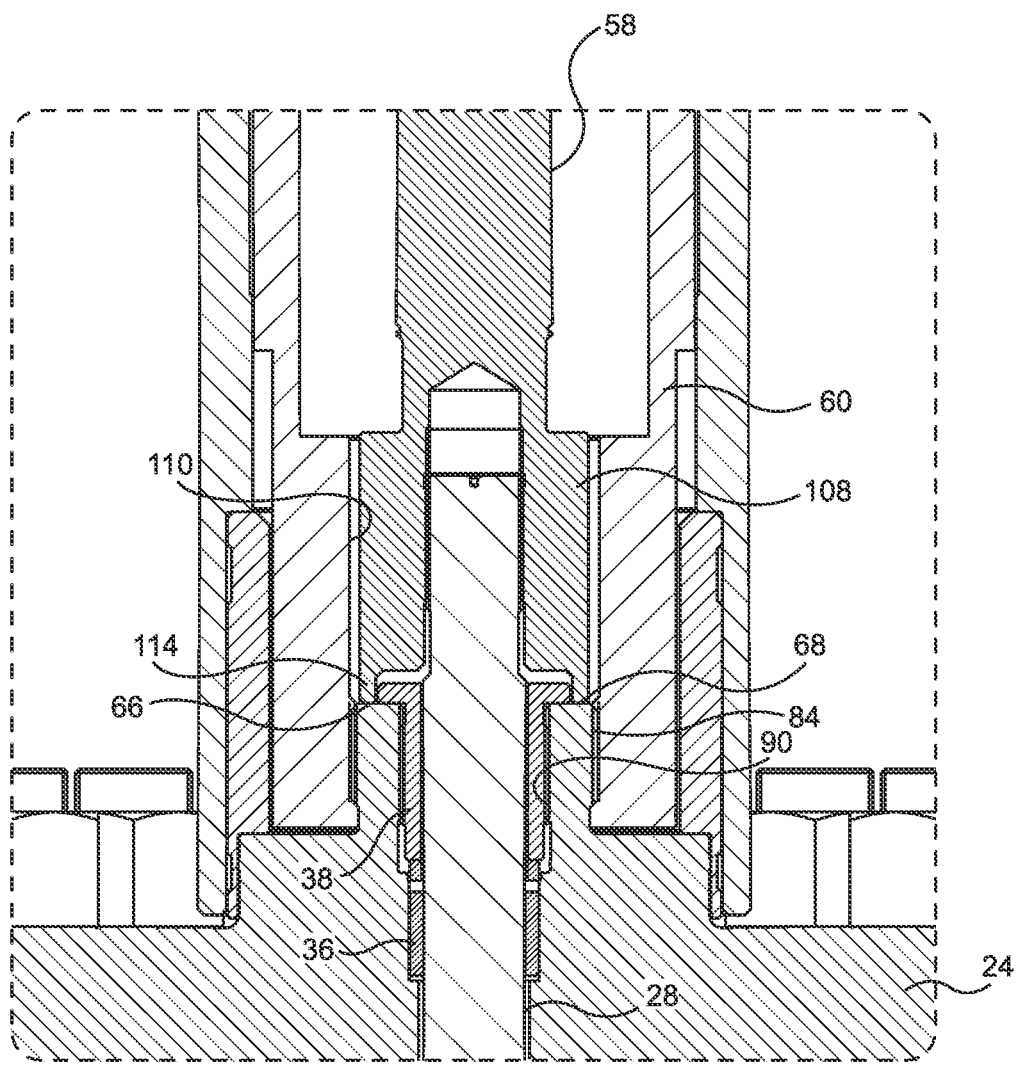

The positive stop arrangement shown in FIG. 12 is somewhat similar to the embodiments shown in FIGS. 10 and 11. Similar to the embodiment shown in FIG. 10, the first stop surface 66 is formed on the bottom end of the actuator shaft 58 of the valve actuator 34. Similar to the embodiment shown in FIG. 11, the second stop surface 68 is formed on a top surface of the upstanding neck portion 84 of the bonnet 24, not on a top surface of the packing nut 38. In this embodiment, the first stop surface 66 is formed on a rim portion 114 which extends axially from the bottom of the actuator shaft 58 and is configured to straddle the top of the packing nut 38 and directly engage the neck portion 84 of the bonnet 24. By having the first stop surface 66 engage the neck portion 84 instead of the packing nut 38, potential damage to the packing nut can be avoided. Also, the positive stop arrangement of the present embodiment is simplified by the elimination of both the positive stop member 70 and the positive stop housing 76.

Figure 13:
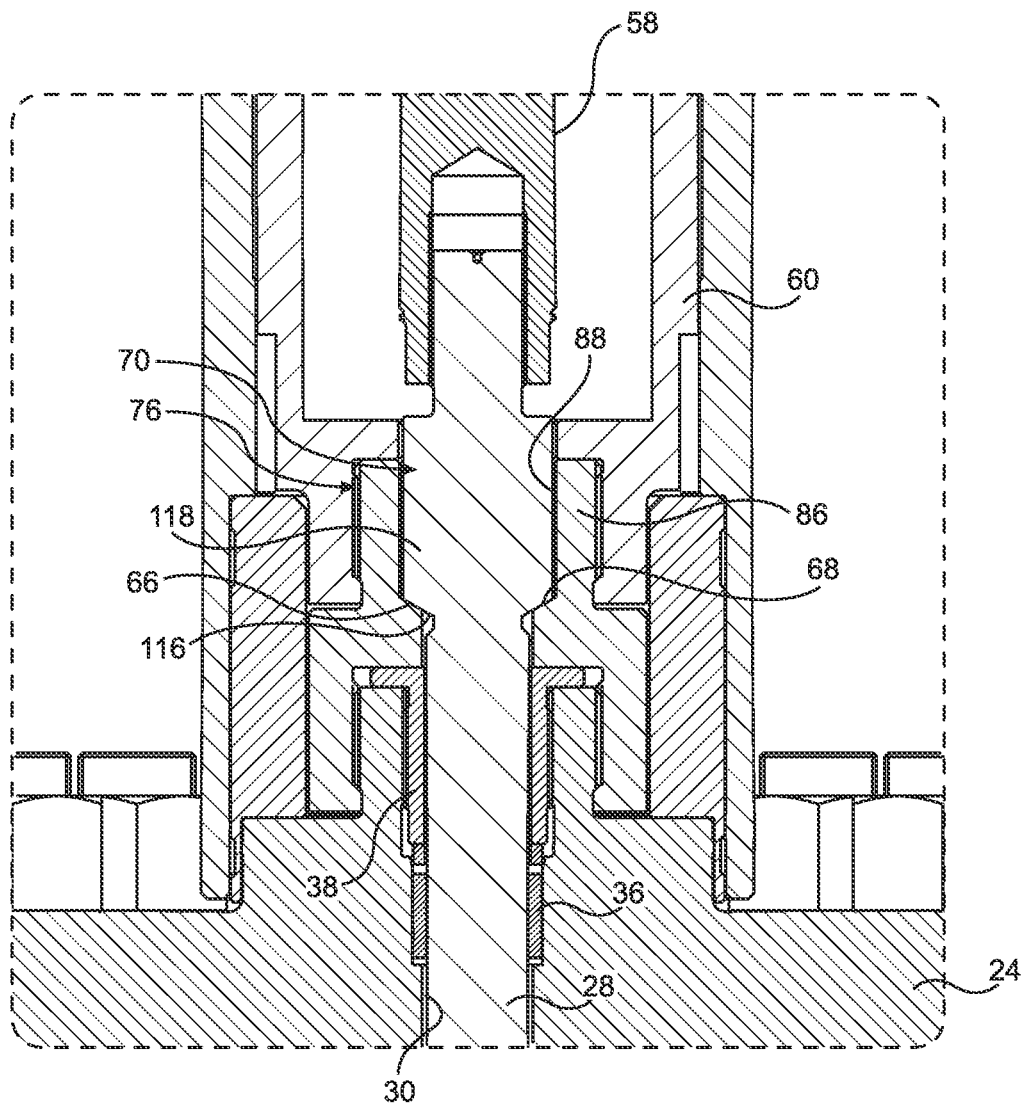

The positive stop arrangement shown in FIG. 13 is somewhat similar to the embodiment shown in FIG. 4. In the embodiment of FIG. 13, however, instead of being a separate component, the positive stop member 70 is formed integrally with the upper end of the valve stem 28. In this embodiment, the first stop surface 66 is formed on an annular shoulder 116 located at the bottom of a radially enlarged portion 118 of the valve stem 28. As in the embodiment of FIG. 4, the second stop surface 68 is formed on or proximate the bottom of the socket 88 in the upper end 86 the positive stop housing 76. The positive stop arrangement of FIG. 13 is simplified by combining the positive stop member 70 with the valve stem 28. In order to facilitate assembly, the first end of the valve stem 28 (i.e., the end which connects to the gate) may need to be configured to enable it to be inserted downwardly through the stem packing 36, the packing nut 38 and the stem bore 30 in the bonnet 24.

Figure 14:
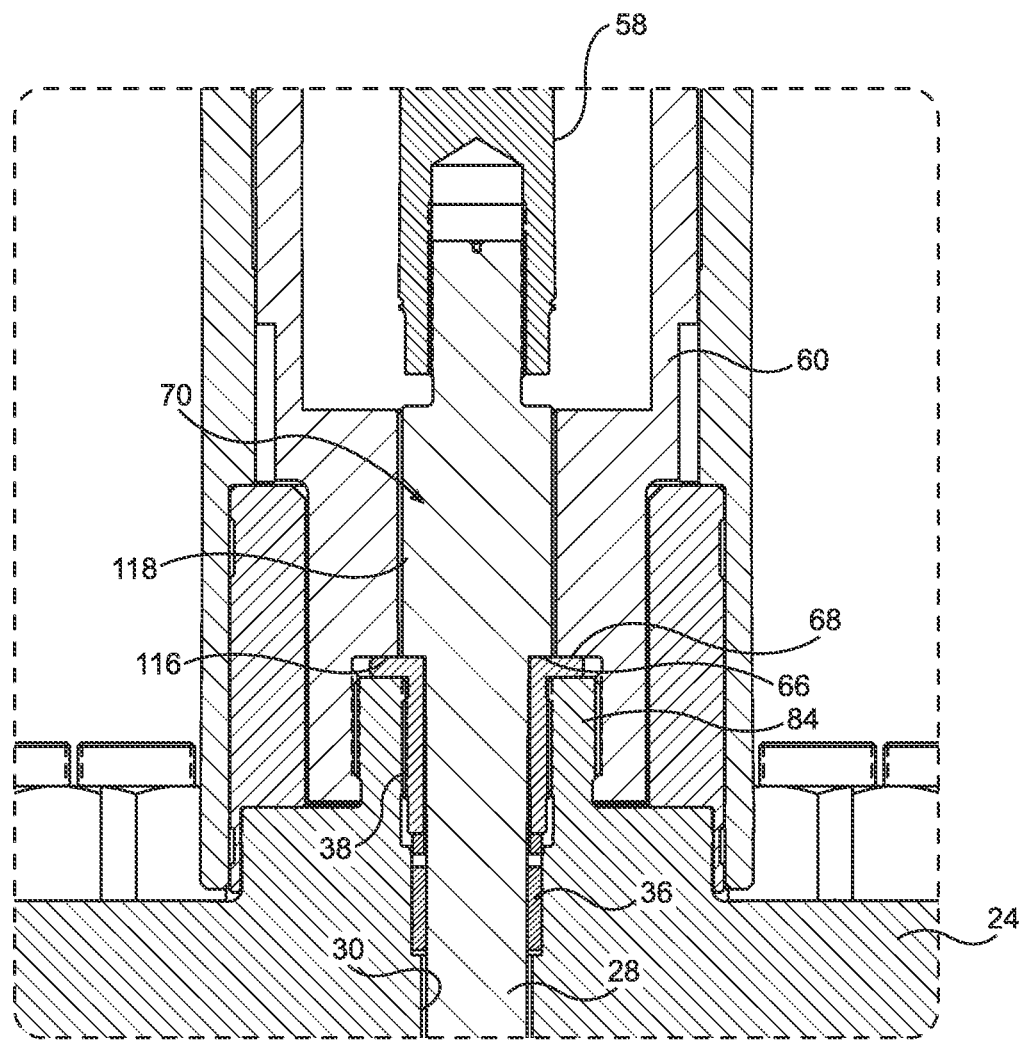

The positive stop arrangement shown in FIG. 14 is somewhat similar to the embodiments shown in FIGS. 9 and 13. Similar to the embodiment of FIG. 9, in the present embodiment the positive stop housing 76 is eliminated, the actuator housing 60 is connected directly to the upstanding neck portion 84 of the bonnet 24, and the second stop surface 68 is formed on a top surface of the packing nut 38. Similar to the embodiment of FIG. 13, the positive stop member 70 is formed integrally with the upper end of the valve stem 28 and the first stop surface 66 is formed on an annular shoulder 116 located at the bottom of a radially enlarged portion 118 of the valve stem 28. The positive stop arrangement of FIG. 13 is simplified by eliminating the positive stop housing 76 and combining the positive stop member 70 with the valve stem 28. As with the embodiment of FIG. 13, the first end of the valve stem 28 (i.e., the end which connects to the gate) may need to be configured to enable it to be inserted downwardly through the stem packing 36, the packing nut 38 and the stem bore 30 in the bonnet 24.

Figure 15:
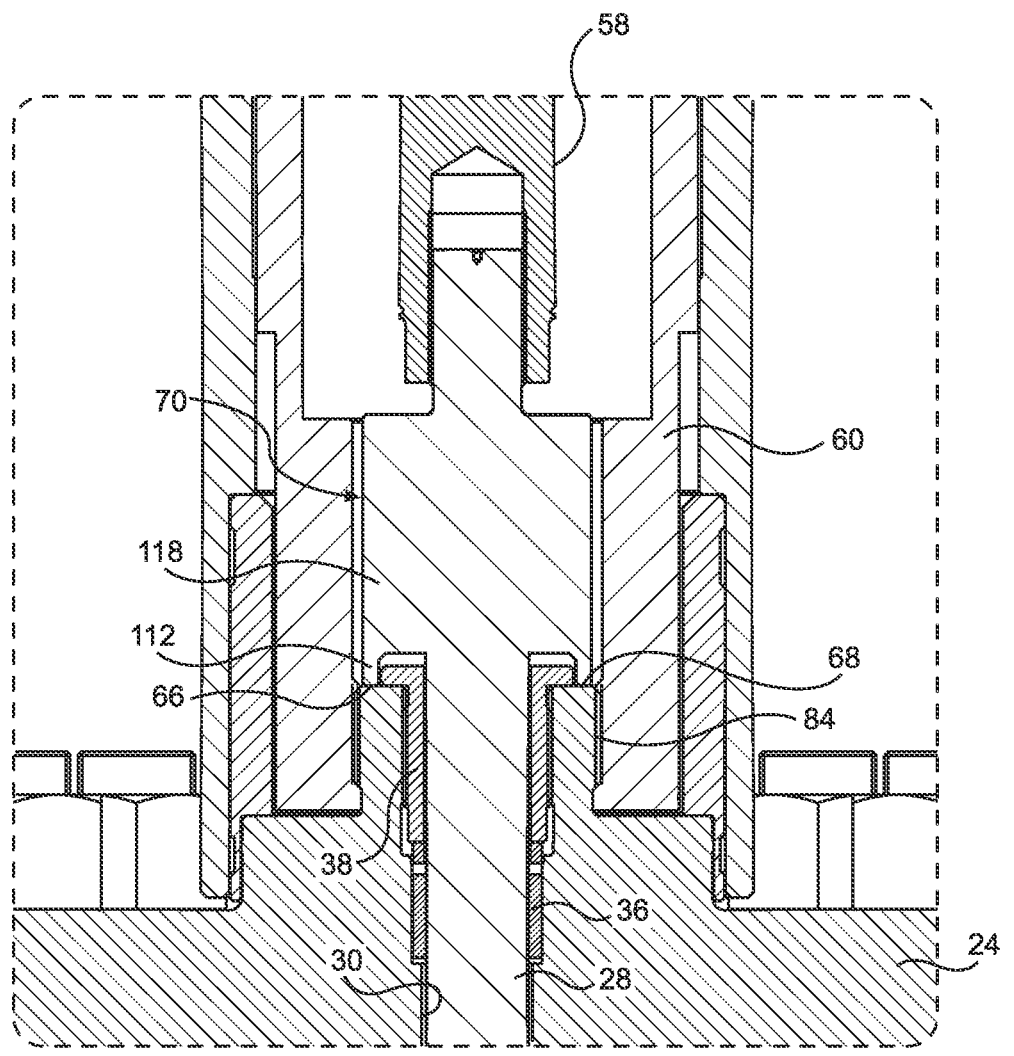

The positive stop arrangement shown in FIG. 15 is somewhat similar to the embodiment shown in FIG. 11. Accordingly, in the present embodiment the positive stop housing 76 is eliminated, the actuator housing 60 is connected directly to the upstanding neck portion 84 of the bonnet 24, the first stop surface 66 is formed on a rim 112 which extends axially from the bottom of the positive stop member 70 and is configured to straddle the top of the packing nut 38, and the second stop surface 68 is formed on the top surface of the neck portion 84. However, instead of being a separate member, the positive stop member 70 is formed integrally with the upper end of the valve stem 28.

In this embodiment, by having the first stop surface 66 engage the neck portion 84 instead of the packing nut 38, potential damage to the packing nut can be avoided. Also, the positive stop arrangement is simplified by eliminating the positive stop housing 76 and combining the positive stop member 70 with the valve stem 28. As with the embodiments of FIGS. 13 and 14, the first end of the valve stem 28 (i.e., the end which connects to the gate) may need to be configured to enable it to be inserted downwardly through the stem packing 36, the packing nut 38 and the stem bore 30 in the bonnet 24.

Figure 16:
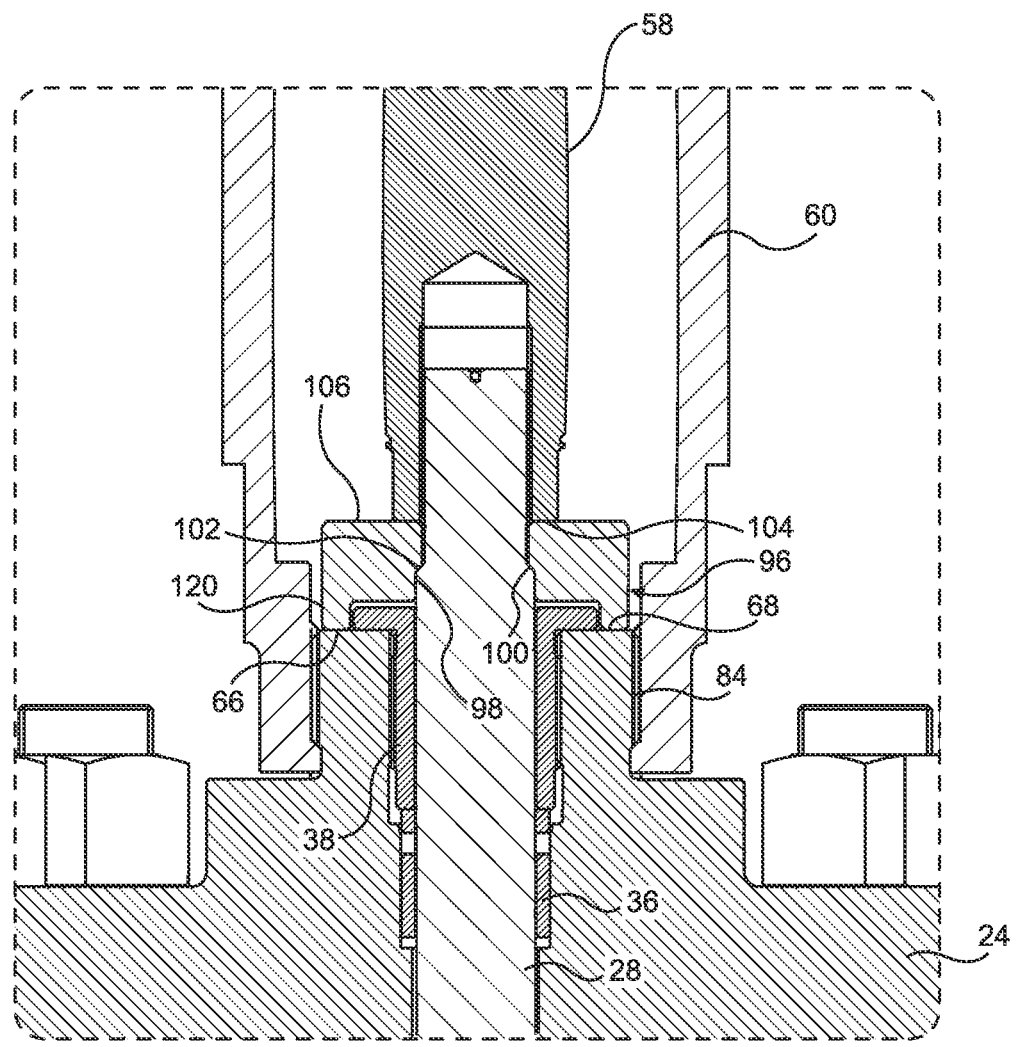

The positive stop arrangement shown in FIG. 16 is somewhat similar to the embodiment of FIG. 9. However, in the present embodiment the second stop surface 68 is formed on a top surface of the upstanding neck portion 84 of the bonnet 24 and the first stop surface 66 is formed on a rim portion 120 which extends axially from the bottom of the positive stop member 96. As shown in FIG. 16, the rim portion 120 is configured to straddle the top of the packing nut 38 and directly engage the top surface of the neck portion 84. By having the first stop surface 66 engage the neck portion 84 instead of the packing nut 38, potential damage to the packing nut can be avoided.

As described above in connection with the embodiment of FIG. 9, the positive stop member 96 may be retained in position on the valve stem 28 by the bottom of the actuator shaft 58. Alternatively, the positive stop member 96 may be secured to the valve stem 28, such as by threads, or formed integrally with the valve stem. If the positive stop member 96 is formed integrally with the valve stem 28, the first end of the valve stem (i.e., the end which connects to the gate) may need to be configured to enable it to be inserted downwardly through the stem packing 36, the packing nut 38 and the stem bore 30 in the bonnet 24.

In accordance with a further aspect of the present disclosure, the gate valve embodiments described above may be configured such that the axial distance between the first stop surface 66 and the bottom 48 of the gate 32 and/or the axial distance between the second stop surface 68 and the bottom 20a of the cavity 20 is adjustable. In accordance with one embodiment of the disclosure, this may be accomplished by rotationally associating the first stop surface with the valve stem such that rotation of the first stop surface relative to the valve stem results in axial translation of the first stop surface relative to the valve stem and/or rotationally associating the second stop surface with the bonnet such that rotation of the second stop surface relative to the bonnet results in axial translation of the second stop surface relative to the bonnet.

For example, the positive stop member 70, 96 may be threadedly connected to the top of the valve stem 28 in such a manner that rotation of the positive stop member 70/96 relative to the valve stem 28 will result in axial translation of the positive stop member relative to the valve stem, which in turn will adjust the axial distance between the first stop surface 66 and the bottom of the gate 32.

Alternatively or in addition, the positive stop housing 76 may be threadedly connected to the neck portion 84 of the bonnet 24 in such a manner that rotation of the positive stop housing relative to the bonnet will result in axial translation of the positive stop housing relative to the bonnet, which in turn will adjust the axial position between the second stop surface 68 and the bottom of the cavity 20.

Such adjustability is independent of the type of actuator employed and enables the positive stop arrangement to be calibrated to ensure that the axial distance between first stop surface 66 and the bottom 48 of the gate 32 is less than the axial distance between the second stop surface 68 and the bottom 20a of the cavity 20. Such spacing will ensure that the gate 32 is free to float within the cavity 20 and thereby form an effective seal with the seats 42.

It should be recognized that, while the present disclosure has been presented with reference to certain embodiments, those skilled in the art may develop a wide variation of structural and operational details without departing from the principles of the disclosure. For example, the various elements shown in the different embodiments may be combined in a manner not illustrated above. Therefore, the following claims are to be construed to cover all equivalents falling within the true scope and spirit of the disclosure.

What is claimed is:

1. A gate valve comprising:
   a valve body having opposite first and second ends, a flowbore which extends through the valve body between the first and second ends, and a gate cavity which extends from a top opening in the valve body across the flowbore;
   a bonnet mounted to the valve body over the top opening, the bonnet comprising an axial stem bore connected to the gate cavity;
   a valve stem movably positioned in the stem bore, the valve stem comprising a first end which extends into the gate cavity;
   a gate connected to the first end of the valve stem, the gate comprising a transverse through bore and being movable by the valve stem between an open position in which the through bore is aligned with the flowbore and a closed position in which the through bore is offset from the flowbore;
   a downwardly directed first stop surface which is fixed in position relative to the valve stem; and
   an upwardly directed second stop surface which is fixed in position relative to the bonnet;
   wherein when the gate is moved downward from the open position to the closed position, the first stop surface will engage the second stop surface and thereby prevent a bottom of the gate from contacting a bottom of the gate cavity; and
   wherein the second stop surface is connected to or formed integrally with the bonnet.

2. The gate valve of claim 1, further comprising a valve actuator mounted on the bonnet, the valve actuator comprising an actuator shaft connected to a second end of the valve stem.

3. The gate valve of claim 2, wherein the first stop surface is connected to or formed integrally with the valve stem or the actuator shaft.

4. The gate valve of claim 2, wherein the actuator shaft is connected to the valve stem through a positive stop member, and wherein the first stop surface is formed on the positive stop member.

5. The gate valve of claim 4, wherein the second stop surface is formed on a positive stop housing which is connected to the bonnet over the stem bore and includes an axial through hole through which the second end of the valve stem extends.

6. The gate valve of claim 2, wherein the first stop surface is formed on a positive stop member which is connected to or formed integrally with the valve stem and the second stop surface is formed on a positive stop housing which is connected to the bonnet over the stem bore and includes an axial through hole through which the second end of the valve stem extends.

7. The gate valve of claim 2, wherein the valve actuator comprises an actuator housing which is fixed in position relative to the bonnet; wherein the second stop surface is formed on a positive stop housing which is connected to the bonnet over the stem bore, and wherein the actuator housing is connected to the positive stop housing.

* * * * *